United States Patent
Fontana, Jr. et al.

(10) Patent No.: US 7,290,324 B2
(45) Date of Patent: Nov. 6, 2007

(54) METHOD FOR FABRICATING A MAGNETIC HEAD INCLUDING A MEDIA HEATING ELEMENT

(75) Inventors: Robert E. Fontana, Jr., San Jose, CA (US); Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 187 days.

(21) Appl. No.: 11/231,201

(22) Filed: Sep. 19, 2005

(65) Prior Publication Data

US 2006/0011484 A1  Jan. 19, 2006

Related U.S. Application Data

(62) Division of application No. 10/631,885, filed on Jul. 30, 2003, now Pat. No. 6,999,277.

(51) Int. Cl.
*G11B 5/127* (2006.01)
*H04R 31/00* (2006.01)

(52) U.S. Cl. .................. 29/603.07; 29/610.1; 29/611; 219/209; 360/122; 360/126; 360/317; 360/324; 360/320; 427/127; 427/128

(58) Field of Classification Search ............... 29/592.1, 29/603.07, 610.1, 611; 219/209; 360/122, 360/126, 128, 317, 324, 320; 427/127, 128
See application file for complete search history.

(56) References Cited

U.S. PATENT DOCUMENTS 6,317,280 B1  11/2001  Nakajima et al.
6,493,183 B1 * 12/2002  Kasiraj et al. ............. 360/126
7,068,468 B2 *  6/2006  Kamijima ................. 360/128
2001/0006435 A1  7/2001  Ichihara et al.
2001/0006436 A1  7/2001  Akiyama et al.
2001/0017820 A1  8/2001  Akiyama et al.

(Continued)

FOREIGN PATENT DOCUMENTS

EP         1037198        9/2000

(Continued)

OTHER PUBLICATIONS

"Data Recording at Ultra High Density", IBM Technical Disclosure Bulletin, vol. 39, No. 07, Jul. 1996.

*Primary Examiner*—Paul D. Kim
(74) *Attorney, Agent, or Firm*—Robert O. Guillot; Intellectual Property Law Offices

(57) ABSTRACT

A magnetic head including a media heating device. Following the fabrication of the heating device, a sacrificial layer of material is deposited to protect the heating device during subsequent process steps. Thereafter, write head components, such as write head induction coils and/or a P1 pole pedestal are fabricated above the heating device, and the sacrificial layer is substantially consumed in protecting the heating device during the aggressive etching and milling steps used to create those components. Further components, including a second magnetic pole are thereafter fabricated to complete the fabrication of the write head portion of the magnetic head. The sacrificial layer may be comprised of alumina, or a material such as NiFe that can act as a seed layer for a subsequent head components such as the P1 pole pedestal.

8 Claims, 6 Drawing Sheets

U.S. PATENT DOCUMENTS

2004/0240109 A1   12/2004   Hamann et al.

FOREIGN PATENT DOCUMENTS

| JP | 61105709 A | 5/1986 |
|---|---|---|
| JP | 2042611 A | 2/1990 |
| JP | 2002074606 A | 3/2002 |
| JP | 2002175602 A | 6/2002 |

* cited by examiner

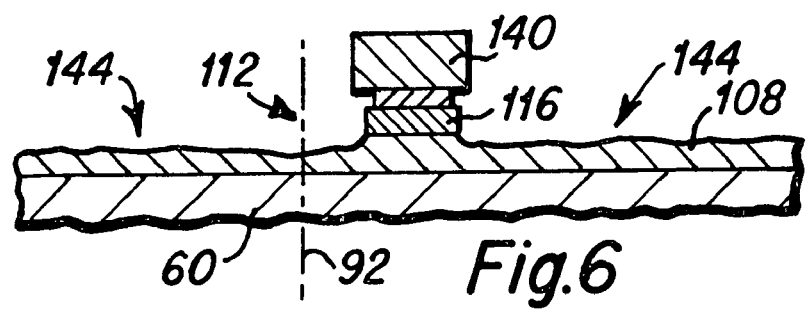
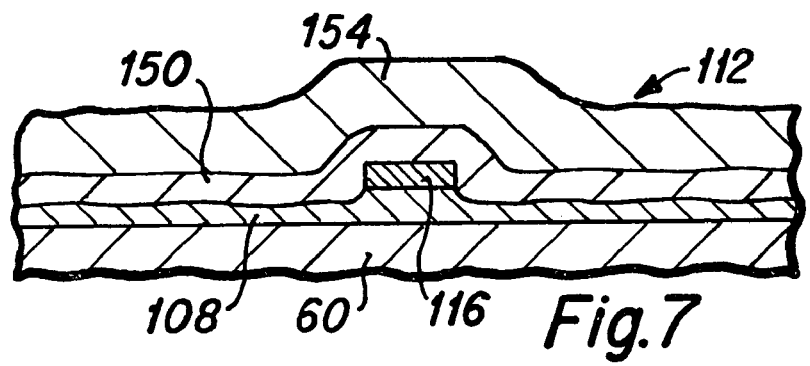
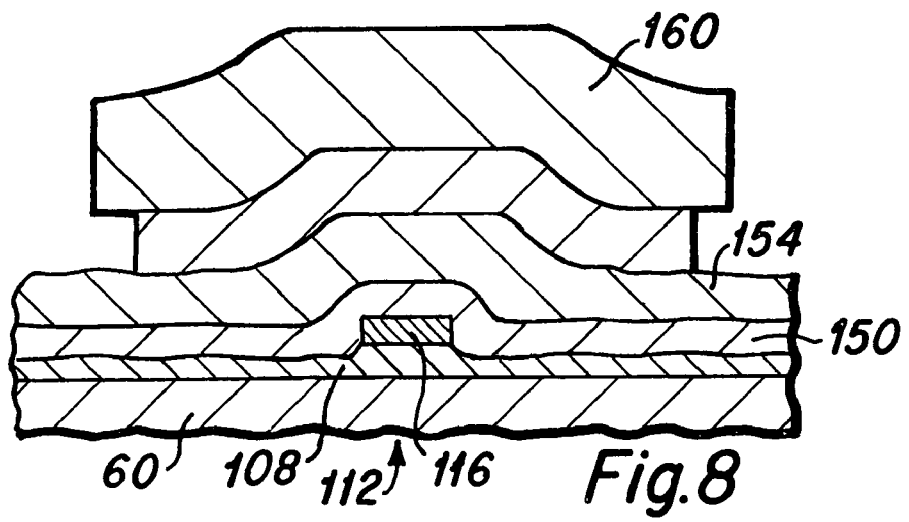
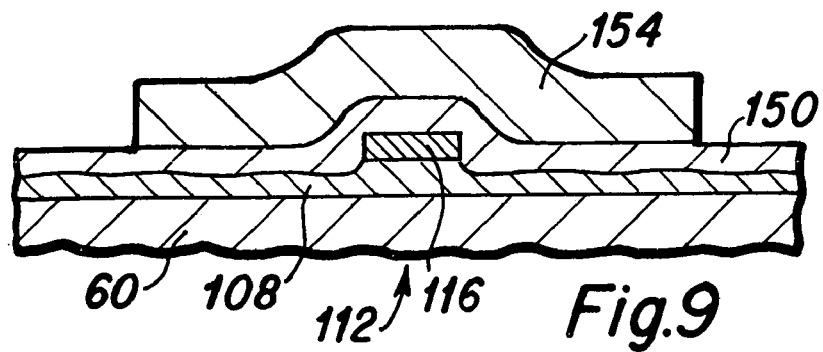

METHOD FOR FABRICATING A MAGNETIC HEAD INCLUDING A MEDIA HEATING ELEMENT

CROSS-REFERENCE TO RELATED APPLICATION

This is a division of application Ser. No. 10/631,885 filed Jul. 30, 2003, now U.S. Pat. No. 6,999,277.

BACKGROUND OF THE INVENTION

1. Field of the Invention

The present invention relates generally to magnetic heads that are utilized with thin film hard disk data storage devices, and more particularly to the design and fabrication of a magnetic head having a storage media heating device formed within the magnetic heads.

2. Description of the Prior Art

As is well known to those skilled in the art, standard magnetic heads include write head elements that include two magnetic poles, commonly termed the P1 and P2 poles, with a write gap layer formed between them. During a data recording procedure, the passage of magnetic flux across the write gap between the two poles creates a magnetic field which influences a thin film layer of magnetic media on a hard disk that is located proximate the magnetic head, such that the changing magnetic flux creates data bits within the magnetic media.

The continual quest for higher data recording densities of the magnetic media demands smaller bit cells, in which the volume of recording material (grains) in the cells is decreased and/or the coercivity (Hc) is increased. When the bit cell size is sufficiently reduced, the problem of the superparamagnetic limit will provide a physical limit of the magnetic recording areal density. A present method to delay the onset of this limit in storage media is the use of a thermally assisted recording head in which a heating device is disposed within the magnetic head. Heat from the heating device is directed to the storage media, and it temporarily reduces the localized coercivity of the media, such that the magnetic head is able to record data bits within the magnetic media. Once the media returns to ambient temperature, the very high coercivity of the media provides the bit latency necessary for the recorded data.

A problem in creating such heating devices within magnetic heads is that the heating device requires protection against subsequent aggressive processing steps such as sputter etching and/or ion milling undertaken in the fabrication of further head components. There is therefore a need to provide protection for such heating devices subsequent to their fabrication.

SUMMARY OF THE INVENTION

A magnetic head of the present invention includes a media heating device that is fabricated within the magnetic head structure following the fabrication of the read head component of the magnetic head. The media heating device serves to heat the magnetic media immediately prior to the passage of the magnetic media beneath the write pole tip of the magnetic head. Heating the media lowers its localized coercivity, and facilitates the writing of data to the media by the write head of the magnetic head.

To protect the heating device from damage during subsequent processing steps, a sacrificial layer of material is formed above the heating device, and during the subsequent processing the sacrificial layer is preferentially removed, such that the heater device is protected. In an exemplary embodiment, the media heating device is fabricated above the first magnetic pole layer close to the ABS surface of the head. Following the fabrication of the heating device, the sacrificial layer is deposited. Thereafter, write head components, such as write head induction coils and/or a P1 pole pedestal are fabricated above the heating device, and the sacrificial layer is substantially consumed in the aggressive etching and milling steps used to create those components. Further components, including a second magnetic pole are thereafter fabricated to complete the fabrication of the write head portion of the magnetic head.

In a preferred embodiment, the heating device includes an electrically resistive heating element, and electrical insulation layers are fabricated beneath and above the heating element to prevent electrical shorting, and the sacrificial layer is formed upon the electrical insulation layer. The heating element is preferably comprised of NiCr, CrV or NiFe, and the insulation layers are preferably comprised of alumina and/or $SiO_2$, such that only commonly utilized inductive head materials are introduced into the magnetic head in fabricating the heating device. The sacrificial layer may be comprised of alumina, or a material such as NiFe that can act as a seed layer for a subsequent head components such as the P1 pole pedestal.

It is an advantage of the magnetic head of the present invention that it includes an improved media heating device to facilitate the writing of data to a magnetic disk.

It is another advantage of the magnetic head of the present invention that a sacrificial layer is fabricated above the heating device to protect it during subsequent head fabrication steps.

It is a further advantage of the magnetic head of the present invention that the heating device is disposed beneath a P1 pole pedestal of the magnetic head, and the sacrificial layer is comprised of a material that acts as a seed layer for the plating of the P1 pole pedestal.

It is an advantage of the hard disk drive of the present invention that it includes a magnetic head that includes an improved media heating device to facilitate the writing of data to a magnetic disk.

It is another advantage of the hard disk drive of the present invention that it includes a magnetic head that includes a sacrificial layer that is fabricated above a heating device to protect it during subsequent head fabrication steps It is a further advantage of the hard disk drive of the present invention that it includes a magnetic head having a heating device that is disposed beneath a P1 pole pedestal of the magnetic head, and the sacrificial layer is comprised of a material that acts as a seed layer for the plating of the P1 pole pedestal.

These and other features and advantages of the present invention will no doubt become apparent to those skilled in the art upon reviewing the following detailed description which makes reference to the several figures of the drawings.

IN THE DRAWINGS

The following drawings are not made to scale of an actual device, and are provided for illustration of the invention described herein.

FIGS. 5-9 are side cross-sectional views depicting successive process steps for fabricating a magnetic head of the present invention;

DETAILED DESCRIPTION OF THE PREFERRED EMBODIMENTS

Figure 1:
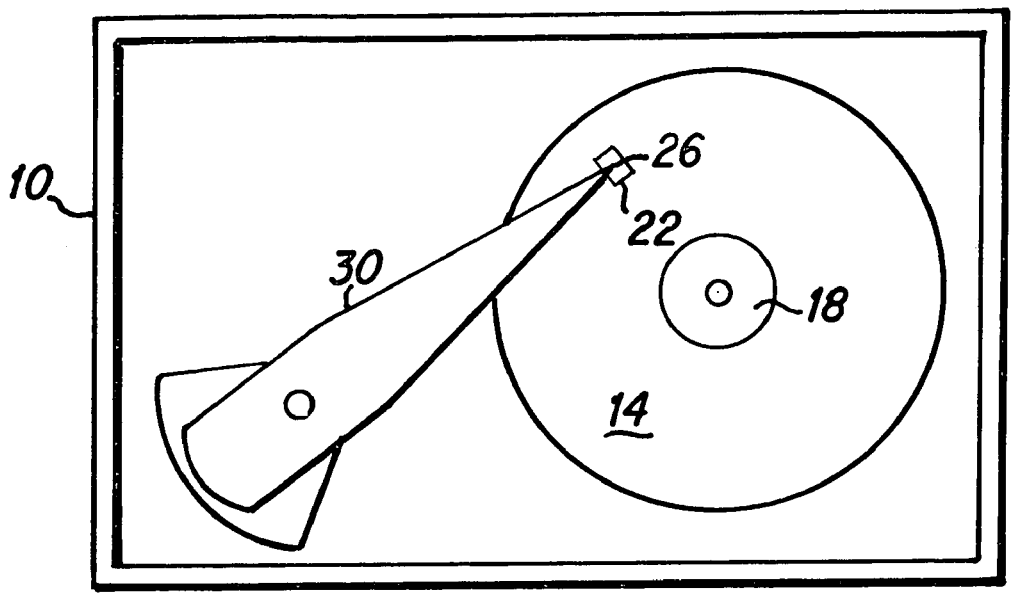
FIG. 1 is a schematic top plan view of a hard disk drive including the magnetic head of the present invention.

Efforts to increase areal data storage density of hard disk drives have lead to improvements in the structure and function of the write head elements of magnetic heads. A simplified top plan view of a typical hard disk drive 10 which is suitable to include the magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14, as is well known to those skilled in the art. The present invention includes improved features and manufacturing methods for such magnetic heads 26, and to better described the present invention a prior art magnetic head is next described.

Figure 2:
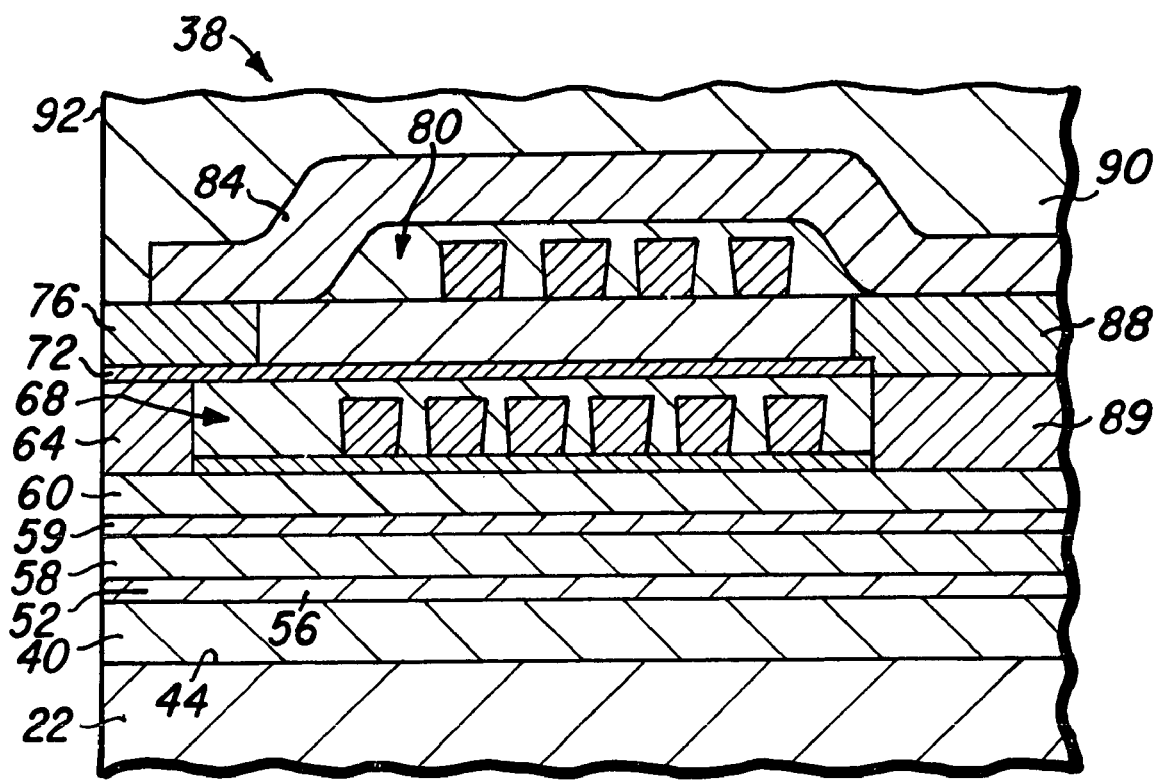
FIG. 2 is a side cross-sectional view depicting various components of a prior art magnetic head.

As will be understood by those skilled in the art, FIG. 2 is a side cross sectional view depicting portions of a prior art magnetic head 38. The magnetic head 38 includes a first magnetic shield layer (S1) 40 that is formed upon a surface 44 of the slider body material 22. A read head sensor element 52 is disposed within insulating layers 56 and a second magnetic shield layer (S2) 58 is formed upon the insulation layers 56. An electrical insulation layer 59 is then deposited upon the S2 shield 58, and a first magnetic pole (P1) 60 is fabricated upon the insulation layer 59.

Following the fabrication of the P1 layer 60, a P1 pole pedestal 64 is fabricated upon the P1 layer 60, and a first induction coil layer 68 is fabricated above the P1 layer within the layer that includes the P1 pole pedestal 64. Thereafter, a write gap layer 72 is deposited, followed by the fabrication of a P2 magnetic pole tip 76. A second induction coil layer 80 is fabricated above the layer containing the P2 pole tip 76. Thereafter, a yoke portion 84 of the second magnetic pole is fabricated in magnetic connection with the P2 pole tip 76, and through back gap elements 88 and 89 to the P1 layer 60. The head is subsequently encapsulated in alumina 90 and fabricated such that an air bearing surface (ABS) 92 is created. It is to be understood that there are many detailed fabrication steps that are well known to those skilled in the art, and which are not deemed necessary to describe herein in order to provide a full understanding of the present invention.

As has been indicated hereabove, the present invention is a magnetic head including a heating device that provides thermal assistance in recording data bits to high coercivity magnetic media. As will be understood from the following detailed description, the magnetic head of the present invention includes an improvement in the resistive heating device fabrication process, where the heating device can be disposed at different locations within the head. For ease of description, this application describes in detail a heating device that is fabricated beneath the P1 pole pedestal 64 and above the P1 pole layer 60; however it is not to be limited to that location. Also, the location and fabrication of other head elements, such as the induction coils, may be varied, and the present invention is not to be limited to the number or location of elements such as the induction coil. The fabrication of a heating device within a magnetic head 26 of the present invention is next described.

Figure 3:
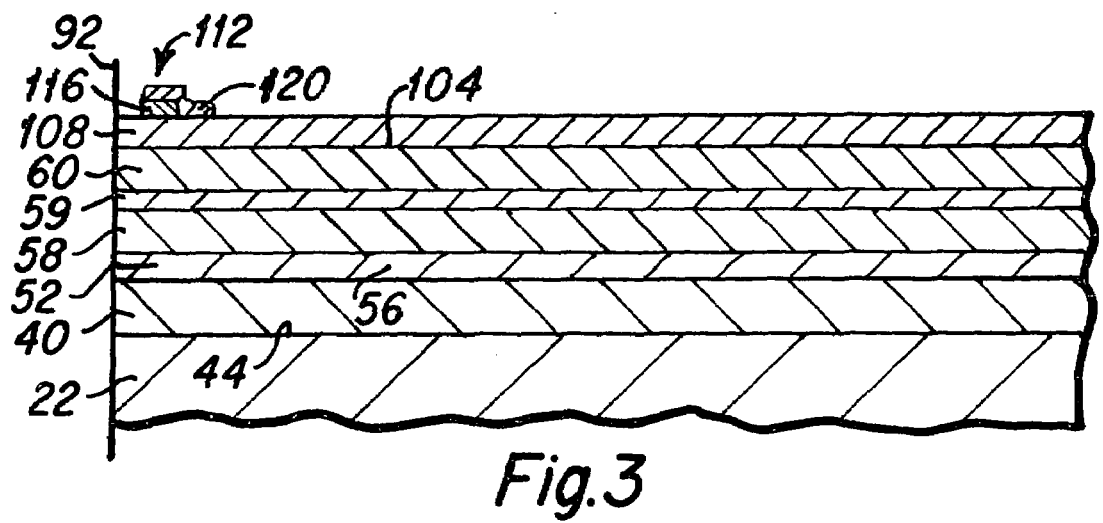
FIGS. 3 is a side cross-sectional view depicting an initial process step for fabricating a magnetic head of the present invention.

FIG. 3 depicts a fabricated read head portion of the magnetic head 26. As with the prior art head depicted in FIG. 2, it includes a first magnetic shield layer 40, a read head sensor element 52 and a second magnetic shield layer 58. It is therefore to be understood that the magnetic head of the present invention makes no significant changes in the fabrication of the read head portion of the magnetic head. As is well known to those skilled in the art, in an alternative magnetic head design the S2 shield 58 also serves as a first magnetic pole, in which case the insulation layer 59 is not fabricated. This alternative magnetic head design is termed a merged magnetic head, and the heating device of the present invention can be fabricated above the shield/pole 58 of a merged magnetic head in the same manner as it is fabricated in the piggyback magnetic head design that is described in detail herein.

As depicted in FIG. 3, following the fabrication of the P1 pole layer 60, a chemical mechanical polishing (CMP) step is preferably undertaken to obtain a smooth surface 104 upon which to fabricate further structures of the magnetic head. An insulation layer 108, that is preferably comprised of alumina or $SiO_2$, is next deposited upon the surface 104 of the P1 layer 60. The insulation layer 108 provides electrical insulation of the heating device described herebelow from the P1 layer 60.

Figure 4:
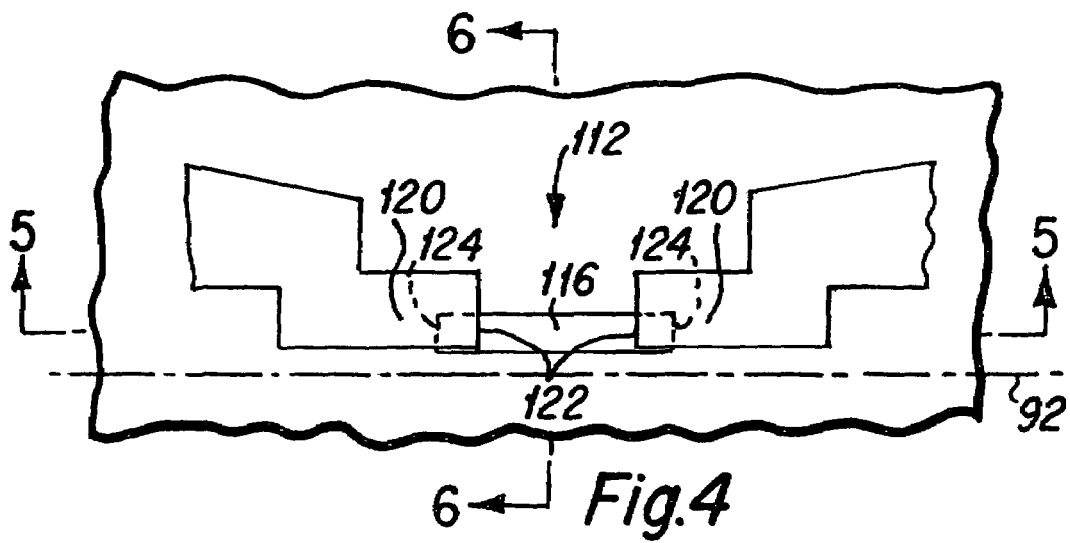
FIG. 4 is a top plan view depicting a media heating device as may be fabricated within the magnetic head of the present invention.

The heating device 112 is next fabricated on top of the insulation layer 108, and FIG. 4 is a top plan view of such a heating device. As is depicted in FIG. 4, the heating device 112 may be fabricated using well known photolithographic techniques in which an electrically resistive heater element 116 and electrical leads 120 of the heating device 112 are successively fabricated. A detailed description of the fabrication of such a heating device is provided in U.S. patent application Ser. No. 10/791,186, filed Mar. 1, 2004, entitled: MAGNETIC HEAD HAVING THERMALLY ASSISTED RECORDING DEVICE, AND METHOD OF FABRICATION THEREOF, the disclosure of which is incorporated herein as though set forth in full. Basically, the heating device 112 includes a central electrically resistive heating element 116 that is fabricated beneath the location in which the write head pole tip will subsequently be fabricated. It is desirable though not necessary that the central portion of the heating element 116 between inner edges 122 of the electrical leads 120 be approximately as wide as the track width of the pole tip because it is generally undesirable to heat portions of the magnetic media disposed on data tracks that are adjacent to the track that is being written upon. It is also desirable, though not necessary, that the heating element 116 be fabricated slightly away from the air bearing surface (ABS) 92 of the head, to limit corrosion of the heating element 116 and to avoid possible electrical discharge from the healing device 112 to the media disk during a writing operation.

A close up cross-sectional view of the heating element and lead ends is provided in the cross sectional view of FIG.

Figure 5:
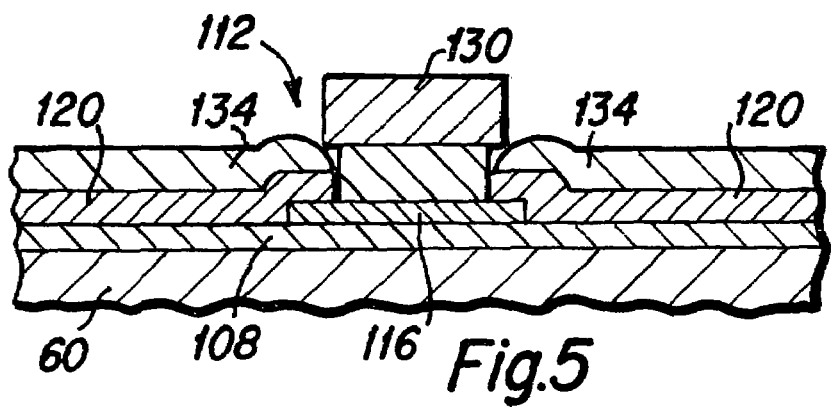

5 which is taken in the direction of lines 5-5 of FIG. 4. As is seen in FIGS. 4 and 5, the heating element 116 may be fabricated first, followed by the electrical lead elements 120 that are deposited on top of and project laterally from the edges 124 of the heating element 116. In one method for creating such a heating device 112, a thin film of heating element material is deposited across the wafer surface above the first electrical insulation layer 108. The central portion of the heating element film is protected by a mask 130 during the fabrication of the electrical leads 120, and a protective layer of electrically insulative alumina 134 may be deposited upon the lead material 120 subsequent to the deposition of the lead material. Thereafter, the mask 130 is removed and, as shown in FIG. 6, a mask 140 in the shape of the footprint of the electrical leads (the footprint being shown in the top view of FIG. 4) is formed. FIG. 6 is a side cross-sectional view of the heating device 112, taken long lines 6-6 of FIG. 4 that depicts the removal of the field material and protection of the heating element by the mask 140. An ion milling or sputter etching step is next conducted in which the alumina and electrical lead material in the field 144 that is unprotected by the mask 140 is removed.

Thereafter, as depicted in FIG. 7, the mask 140 is removed, exposing the surface of the heating device 112. As indicated hereabove, the goal of the present invention is to protect the heating device 112 during subsequent head fabrication steps. Initially, as depicted in FIG. 7, an electrical insulation layer 150, preferably composed of alumina, is deposited full film across the surface of the wafer. A desirable thickness for the alumina insulation layer 150 is approximately 250 Å. To further protect the heating device 112, a layer of material 154 to be sacrificed in later processing is next deposited, full film across the surface of the wafer, upon the alumina insulation layer 150. As will be understood from the following description, the sacrificial layer 154 is intended to protect the heating device 112 during subsequent aggressive fabrication steps, such as sputter etching and/or ion milling steps, and it is not intended that the full sacrificial layer 154 remain in the finished head, as is described herebelow. The sacrificial layer 154 is approximately 1,000 to 2,000 Å thick, and is preferably comprised of a material that is commonly utilized in the magnetic head. Thus, the sacrificial layer 154 may be comprised of alumina or a material such as nickel iron which can act as a seed layer for a subsequent magnetic head component that is fabricated above the heating device, such as the P1 pole pedestal described herebelow.

Figure 10:
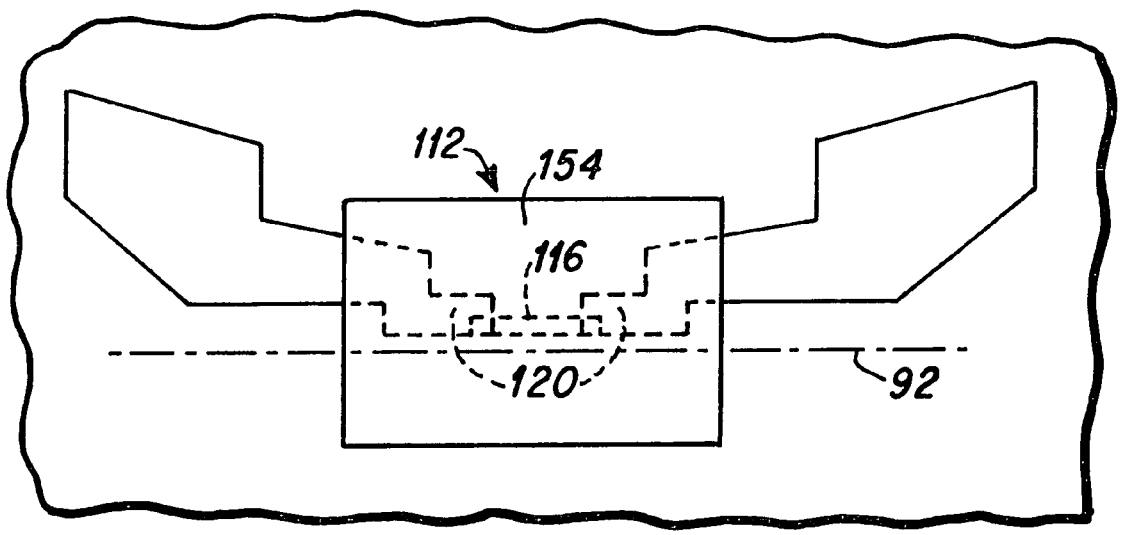
FIG. 10 is a top plan view depicting the sacrificial layer above the media heating device of a magnetic head of the present invention.

As is next seen in FIG. 8, following the full film deposition of the sacrificial layer 154 across the surface of the wafer, a bilayer mask 160 is fabricated above the heating device 112 to shield it. Thereafter, as depicted in FIG. 9, an ion milling step is conducted in which the unmasked field portions of the sacrificial layer 154 are removed. Following the ion milling step the mask 160 is removed, such as through the use of an appropriate solvent. FIG. 9 depicts the remaining sacrificial layer 154 and alumina insulation layer 150 following the milling step, and FIG. 10 is a top plan view of the remaining protective sacrificial layer 154 that is formed above the heating device 112. As is best seen in FIG. 10, the remaining sacrificial layer 154 is sized to protect the central portion of the heating device, including the central heating element 116 and the inner portions of the electrical leads 120. The protective sacrificial layer 154 therefore extends outwardly to a sufficient extent to protect the central portions of the heating device 112 from subsequent aggressive processing steps, such as sputter etching and ion milling steps that are undertaken in the fabrication of further magnetic head components, such as, by way of example, are next described.

Figure 11:
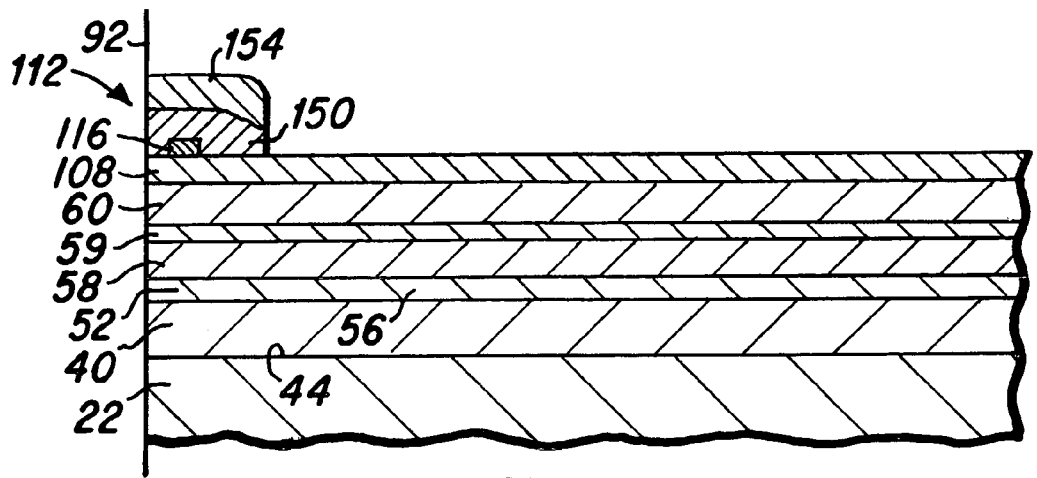
FIGS. 11-14 are side cross-sectional views depicting further successive process steps for fabricating a magnetic head of the present invention.
Figure 12:
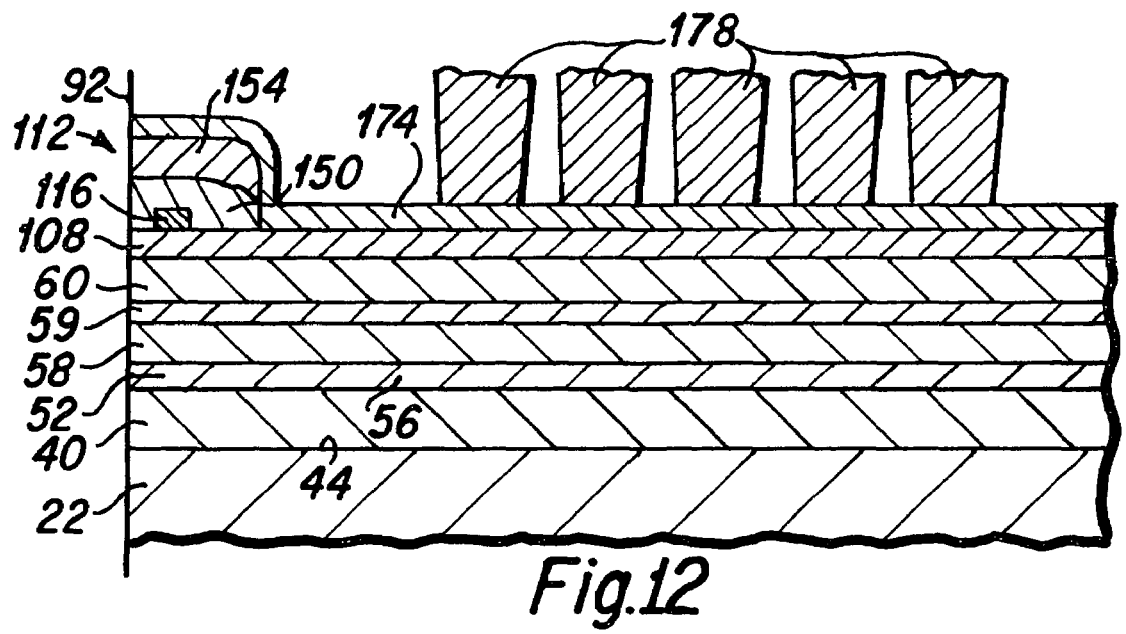

FIG. 11 is a side cross-sectional view, similar to the view taken in FIG. 3, showing the fabricated heating device 112 disposed upon the insulation layer 108, and having the alumina layer 150 and sacrificial layer 154 formed thereon. By way of example, and as is next depicted and described, an induction coil may be next fabricated upon the head. As depicted in FIG. 12, in fabricating the induction coil, a seed layer 174, typically comprised of copper is first deposited upon the wafer, including above the sacrificial layer 154. Thereafter, in well known fabrication steps, an electroplating photoresist layer (not shown) is fabricated in the shape of the induction coil turn trenches upon the seed layer 174, and the induction coil turns 178 are subsequently plated up into the coil turn trenches of the photoresist layer. The photoresist layer is subsequently removed, such as by use of a chemical stripper. At this point, the coil turns 178 are fabricated upon the seed layer 174 and it is next necessary to remove the seed layer 174, particularly from in between the induction coil turns 178, to prevent electrical shorting between the coil turns.

Figure 13:
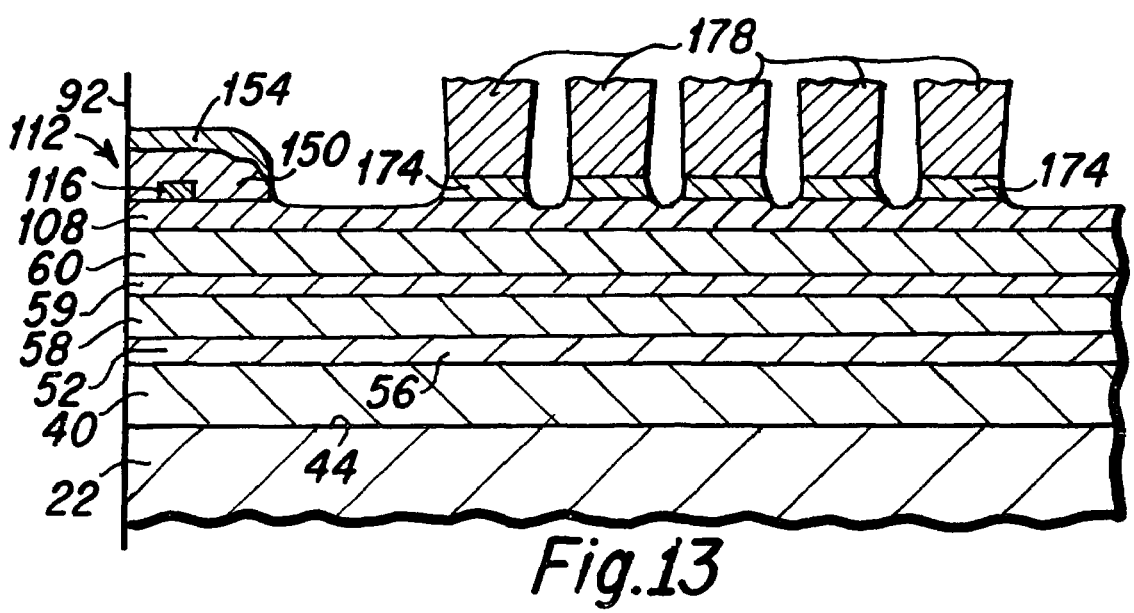

The removal of the seed layer 174 is accomplished utilizing an aggressive sputter etching step in which the seed layer 174 is etched from the surface of the wafer. Because the seed layer 174 is difficult to completely remove from the relatively tight spaces between the coil turns 178, an aggressive etching process is required to assure its removal. FIG. 13 depicts the head following the seed layer removal etching step. It can be seen that, the aggressive etching that is required to assure the removal of the seed layer 174 from between the induction coil turns removes a significant quantity of material from other exposed wafer surface elements, including above the heating device 112. Therefore, as seen in FIG. 13, nearly all of the sacrificial layer 154 has been etched away (sacrificed) in the process step of removing the induction coil seed layer. If the sacrificial layer 154 had not been fabricated, the aggressive seed layer etching step would likely result in the removal of the insulation layer 150 above the heating device 112 and the unwanted etching and removal of portions of the heating device, thereby damaging or destroying it. Thus the sacrificial layer 154 serves to protect the heating device 112 during the subsequent aggressive fabrication steps, such as the induction coil fabrication steps.

Figure 14:
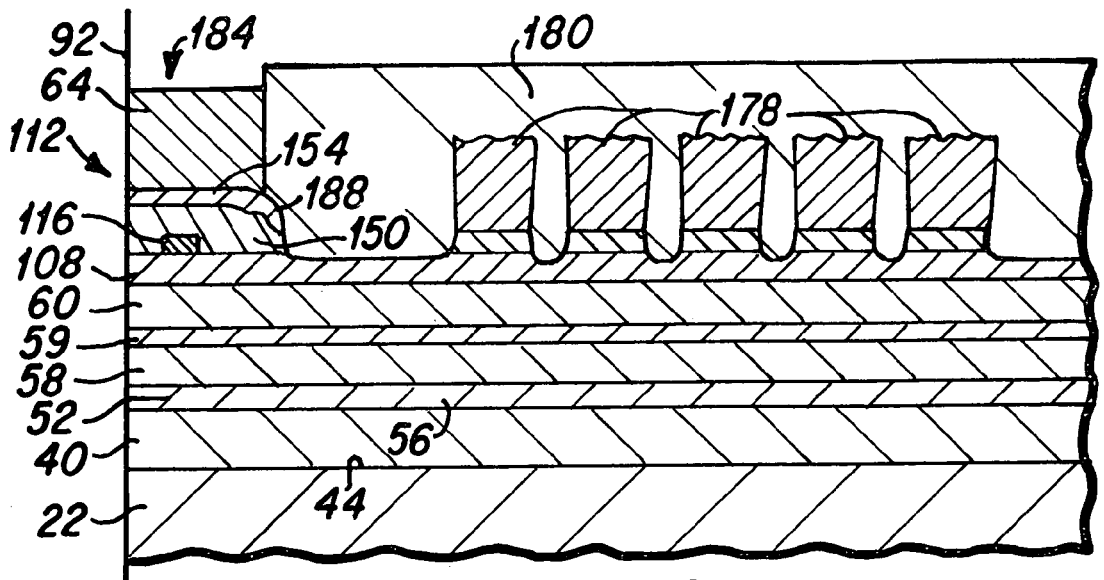

As is next depicted in FIG. 14, a patterned insulation layer 180 may be deposited to fill the induction coil, such that an opening 184 is provided in it for the subsequent fabrication of a P1 pole pedestal 64. As is seen in FIG. 14, the remaining NiFe sacrificial layer 154 can serve as a seed layer for the P1 pole pedestal 64 which is typically composed of a magnetic material such as NiFe. As is also depicted in FIG. 14, a remnant portion 188 of the NiFe sacrificial layer may typically remain around the edge portions of the P1 pole pedestal 64 that are covered by the filling insulation layer material 180.

Figure 15:
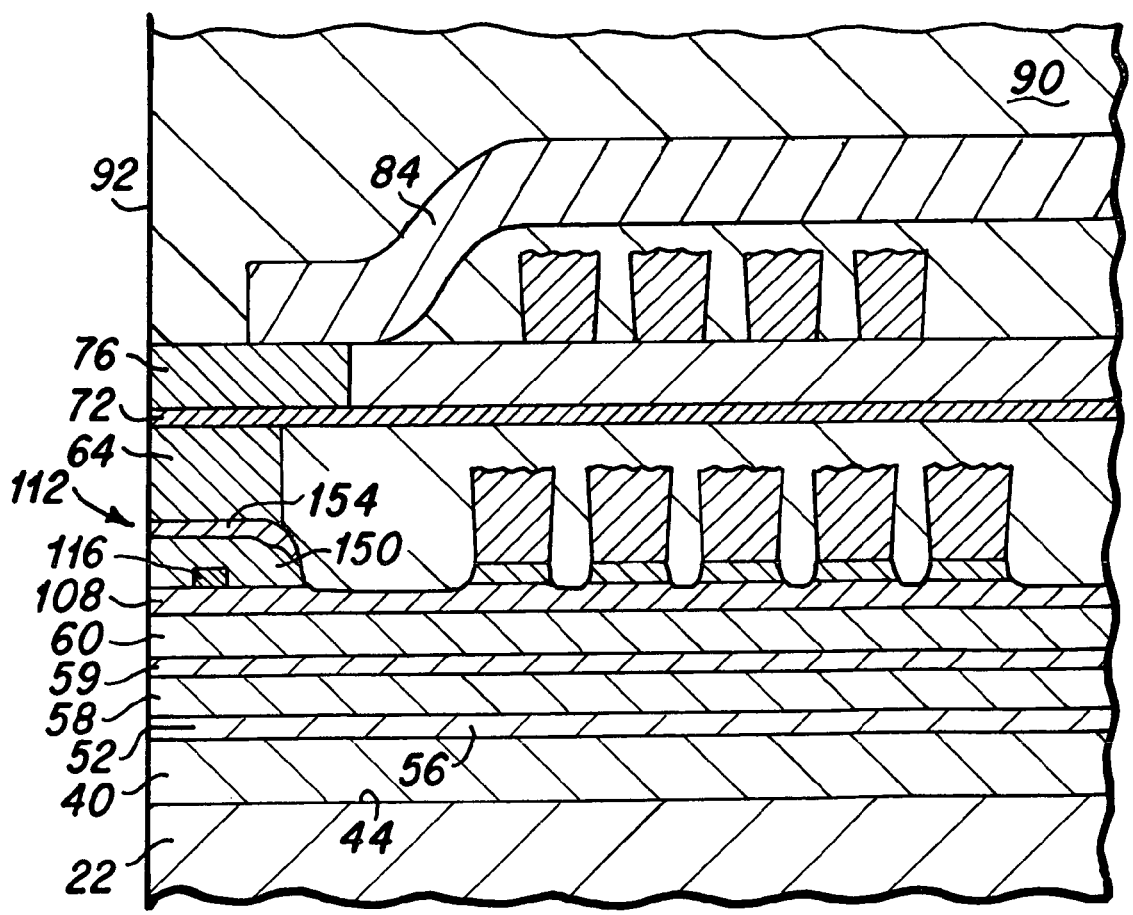
FIG. 15 is a side cross-sectional view depicting a completed magnetic head of the present invention.

As is next depicted in FIG. 15, further magnetic head components are subsequently fabricated to complete the manufacture of the magnetic head 26. The steps for fabricating such additional components are essentially identical to those undertaken in the fabrication of those components of the prior art head depicted in FIG. 2, and the components are identically numbered for ease of comprehension.

It is therefore to be understood that the significant features of the present invention are the fabrication of a sacrificial layer that is deposited above the heating device to protect it during subsequent aggressive head fabrication steps. The sacrificial layer is intended to be primarily consumed during subsequent aggressive fabrication steps and it's use results in increased throughput of heads during the manufacturing process and greater reliability of the fabricated heads. The heating device may be fabricated in differing locations within the magnetic head, and the magnetic head itself may be a longitudinal (as depicted herein) or a perpendicular head, as are well known to those skilled in the art.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention. Further, Applicant's intent is to encompass the equivalents of all claim elements, and no amendment to any claim in the present application should be construed as a disclaimer of any interest in or right to an equivalent of any element or feature of the amended claim.

What is claimed is:

1. A method for fabricating a magnetic head, comprising:
fabricating a first magnetic pole of said magnetic head;
depositing a first electrical insulation layer upon said first magnetic pole;
fabricating a media heating device upon said first electrical insulation layer;
depositing a second electrical insulation layer upon said media heating device;
depositing a sacrificial layer upon said second electrical insulation layer;
fabricating a further component of said magnetic head wherein said fabrication of said further component includes a step that results in removing portions of said sacrificial layer that are disposed above said media heating device.

2. The method for fabricating a magnetic head as described in claim 1 wherein said sacrificial layer is composed of a material that serves as an electroplating seed layer.

3. The method for fabricating a magnetic head as described in claim 2, wherein said sacrificial layer is comprised of nickel iron.

4. The method for fabricating a magnetic head as described in claim 2, wherein said another component of the magnetic head is a second magnetic pole.

5. The method for fabricating a magnetic head as described in claim 1, wherein said media heating device includes an electrically resistive heating element.

6. The method for fabricating a magnetic head as described in claim 1, wherein said step of depositing a sacrificial layer includes the step of depositing the sacrificial layer material full film across a surface of a wafer wherein said magnetic head is fabricated.

7. The method for fabricating a magnetic head as described in claim 1, wherein said further component is an induction coil portion of said magnetic head.

8. The method for fabricating a magnetic head as described in claim 1, wherein said further component is an induction coil portion of the magnetic head, and a second magnetic pole is fabricated upon said sacrificial layer following said step that results in removing portions of said sacrificial layer.

* * * * *